UNITED STATES PATENT OFFICE.

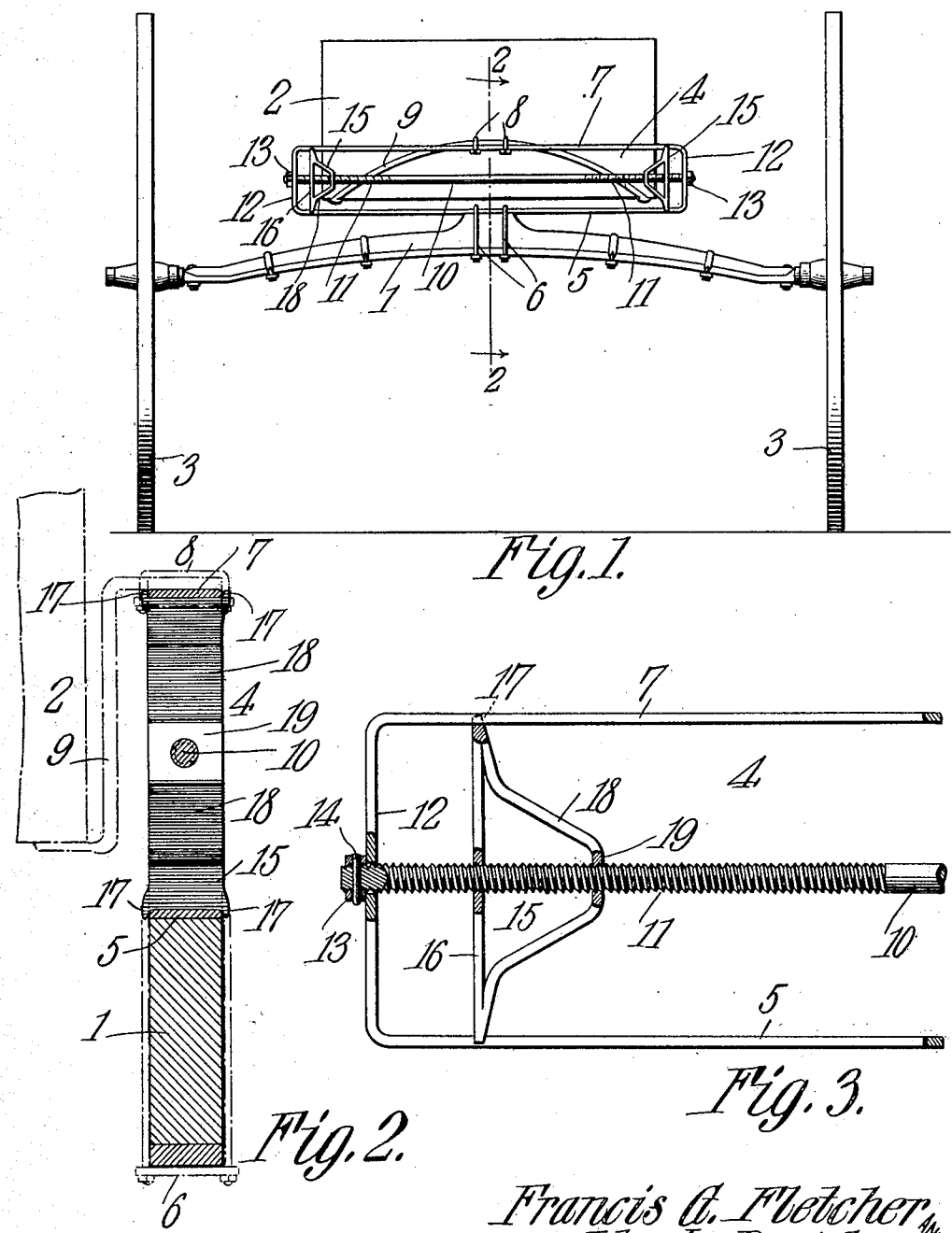

FRANCIS GROVER FLETCHER AND JOHN LAKE REGISTER, OF O'BRIEN, FLORIDA.

VEHICLE-SPRING.

No. 892,041.  Specification of Letters Patent.  Patented June 30, 1908.

Application filed July 13, 1907. Serial No. 383,675.

*To all whom it may concern:*

Be it known that we, FRANCIS GROVER FLETCHER and JOHN LAKE REGISTER, citizens of the United States, residing at O'Brien, in the county of Suwanee and State of Florida, have invented a new and useful Vehicle-Spring, of which the following is a specification.

This invention relates to a vehicle spring of a type applicable to a great variety of vehicles, and has for its main object to provide a spring which may be adjusted to the weight to be carried, and to this end it comprises a spring frame of rectangular form fastened at the center of one of its longer sides to the running gear of a vehicle and at the center of its other similar side to the vehicle body. Through the longitudinal center of the spring frame is a rod threaded at its ends in opposite directions which ends pass through movable blocks bearing against the longer spring sides or bars, the whole being so arranged that when the rod is turned in one direction, the blocks will be brought nearer each other with the result of shortening the spring bars, thereby increasing the strength or stiffening the spring; and when turned in the opposite direction the spring will become less resisting and easier.

With this and other objects in view the invention consists of certain noval combination, arrangement and construction of parts hereinafter described and definitely claimed.

In the accompanying drawing which illustrates the invention applied to a light vehicle such as a buggy; Figure 1 is a rear elevation of a carriage with the improved adjustable spring applied thereto. Fig. 2 is an enlarged vertical section on the line 2—2 of Fig. 1. Fig. 3 is an elevation of one end of the spring on the same scale as Fig. 2 with portions broken away to more clearly illustrate the construction.

Similar reference numerals are used for the same parts on all the figures.

Referring to Fig. 1 the numeral 1 indicates the rear axle of a buggy above which is the body 2, the axle being carried on wheels 3 as usual. The spring indicated by 4 consists of a long rectangular steel frame 5 parallel to the axle and preferably projecting beyond the sides of the body, having its long bottom bar connected centrally to the middle of the axle by clips 6 of well known construction, and its similar upper bar 7 fastened centrally by clips 8 to the vehicle body. In the drawing the spring is represented as fastened at its center to an upwardly arched supporting frame 9 at the rear of the body 2 and attached to the bottom thereof at each side.

A spring thus constructed and mounted on a vehicle substantially in the manner described, if made of material of such width and gage as to afford sufficient spring action for a light load, would be too yielding and cause unpleasant jolting and shaking when the vehicle is carrying a heavy load. To overcome this defect and make the spring quickly adjustable to the weight to be carried, means are provided for easily and quickly changing the active length of the upper and lower spring bars 5 and 7, thereby stiffening the spring. The means comprises a round rod 10 extending centrally from one end of the spring frame to the other and threaded at each end 11 in opposite directions. The rod 10 turns freely in the ends 12 of the spring frame 4 and project therethrough carrying on each end a nut or other polygonally shaped head 13 securely fastened thereto by a pin 14 or otherwise.

Threaded on each end 11 of the rod 10 within the ends of the spring frame 4 is a spacing member or block 15 which may be either solid, or of skeleton form as shown in Fig. 3. In the latter construction the block 15 consists of a vertical strip 16 of metal, of the same width approximately as the spring frame 4, extending from the lower spring bar 5 to the upper one 7 and having a lug 17 on each corner to retain the spring bars in position on the block 15 and also to prevent the blocks from rotating. Projecting inwardly from each vertical strip 16 is a bracket like extension 18 consisting of a metal strip of similar width as that 16, fastened at its ends to the ends of the strip 16, having inclined sides and a vertical central portion 19 provided with a threaded aperture similar to the one in the vertical strip 16 through which the threaded end of the rod 10 passes.

It is to be remembered that although the spring is shown attached to the rear of one class of vehicles only, it may be used also at the front and sides of all vehicles to which it is adapted.

A vehicle equipped with springs in the manner shown in Fig. 1 with the block 15 at the ends of the spring frame 4, is suitable for a light load only and will cause the passengers of suitable weight to ride easily therein as the full length of the bars 5 and 7 of the springs are in action. When a greater load is carried by the vehicle a wrench may be applied to either of the ends or heads 13 so as to rotate the rod 10 and cause the blocks to move towards each other and the center of the spring frame and so shorten the active length of the bars 5 and 7, thus making the spring stiffer and less easily responsive to slight inequalities in the road, but sufficiently yielding for the weight to be carried.

It will thus be noted that by merely turning the bar 10 in one or the other direction, the resiliency of the spring is changed to suit the weight to be carried in the vehicle.

Having thus described the invention, what is claimed is:—

1. A vehicle spring comprising two separated fixed spring bars, blocks between the ends of the bars in sliding contact with said bars, and means for simultaneously moving the blocks to and from each other.

2. A vehicle spring comprising two separated spring bars connected together at their ends, blocks between said bars and in contact therewith, one of said bars adapted to be attached at its center to the running gear of a vehicle, the other bar adapted to be centrally attached to a vehicle body, and means for sliding said blocks simultaneously in opposite directions.

3. A vehicle spring comprising a rectangular frame having its longer sides parallel, slidable blocks between said longer sides, a rod extending centrally of the frame with its ends projecting freely through the shorter sides and having reversed screw threads on its ends engaging said blocks, a polygonal head on one end of said rod for rotating said rod and sliding said blocks simultaneously in opposite directions.

4. A vehicle spring comprising longitudinally spaced spring bars having relatively fixed ends, slidable members interposed between and contacting with the bars, and means for simultaneously actuating said members to diminish or increase the distance therebetween.

5. A vehicle spring comprising longitudinally spaced spring bars, members interposed therebetween and slidably mounted and supported thereon, and means for simultaneously shifting said members toward or from each other, said members constituting spacing means.

In testimony that we claim the foregoing as our own, we have hereto affixed our signatures in the presence of two witnesses.

FRANCIS GROVER FLETCHER.
JOHN LAKE REGISTER.

Witnesses:
JASPER L. BARNES,
DENNIS RICKERSON.